United States Patent
Brokish et al.

(10) Patent No.: US 7,539,349 B2
(45) Date of Patent: May 26, 2009

(54) CLEAR IMAGE USING PIXEL VOTING

(75) Inventors: Kevin Brokish, Fort Collins, CO (US); Norman Conrad Pyle, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 717 days.

(21) Appl. No.: 11/259,696

(22) Filed: Oct. 25, 2005

(65) Prior Publication Data

US 2007/0092152 A1 Apr. 26, 2007

(51) Int. Cl.
*G06K 9/40* (2006.01)
*G06K 9/32* (2006.01)
*G06K 9/00* (2006.01)

(52) U.S. Cl. .................. 382/254; 382/294; 382/162

(58) Field of Classification Search .............. 382/254, 382/162; 348/619, 621
See application file for complete search history.

(56) References Cited

U.S. PATENT DOCUMENTS

| | | | |
|---|---|---|---|
| 5,469,536 A | | 11/1995 | Blank |
| 5,488,674 A | | 1/1996 | Burt |
| 5,572,597 A | * | 11/1996 | Chang et al. ................ 382/125 |
| 5,625,705 A | * | 4/1997 | Recht ......................... 382/128 |
| 5,642,294 A | * | 6/1997 | Taniguchi et al. ........... 348/700 |
| 5,657,397 A | * | 8/1997 | Bokser ....................... 382/225 |
| 5,754,692 A | * | 5/1998 | Kondo et al. ................ 382/216 |
| 5,903,665 A | * | 5/1999 | Tanaka ........................ 382/162 |
| 6,058,208 A | * | 5/2000 | Ikeda et al. .................. 382/167 |
| 6,075,905 A | * | 6/2000 | Herman et al. .............. 382/284 |
| 6,088,470 A | * | 7/2000 | Camus et al. ............... 382/117 |
| 6,100,937 A | * | 8/2000 | DiMeo ........................ 348/621 |
| 6,128,108 A | * | 10/2000 | Teo ............................. 358/540 |
| 6,272,287 B1 | | 8/2001 | Cipolla et al. |
| 6,343,145 B1 | * | 1/2002 | Schuneman et al. ......... 382/162 |

(Continued)

FOREIGN PATENT DOCUMENTS

WO WO 99/62249 A 12/1999

OTHER PUBLICATIONS

Gibbs et al, "The Fusion of Multiple Image Analysis Algorithms For Robot Road Following", IEE Image Processing and its Applications, Jun. 4, 1995, pp. 394-398.

(Continued)

*Primary Examiner*—Samir A. Ahmed
*Assistant Examiner*—Li Liu (57) ABSTRACT

A user provides a plurality of digital images of a single subject all taken from a single location and with common camera settings. This set of digital images is parsed one pixel location at a time. For each pixel location, a set of pixel colors is extracted from each of the plurality of digital images. For each of these pixel colors, a relationship parameter to each of the other pixel colors in the set is calculated. Using this relationship parameter information, the final desired pixel color is chosen and applied to the pixel location in a final image.

20 Claims, 6 Drawing Sheets

U.S. PATENT DOCUMENTS

| | | | |
|---|---|---|---|
| 6,373,499 | B1 | 4/2002 | Acker |
| 6,470,151 | B1 | 10/2002 | Ohsawa |
| 6,516,154 | B1 | 2/2003 | Parulski et al. |
| 6,619,860 | B1 | 9/2003 | Simon |
| 7,283,645 | B2 * | 10/2007 | Krumm et al. ............... 382/103 |
| 7,349,571 | B2 * | 3/2008 | Katsuyama ................. 382/162 |
| 2002/0136449 | A1 * | 9/2002 | Park et al. ................... 382/164 |
| 2007/0081736 | A1 * | 4/2007 | Kefeder et al. .............. 382/254 |

OTHER PUBLICATIONS

Han et al, "Detecting Moving Humans Using Color and Infrared Video", IEEE Intl. Conf. Multisensor Fusion and Integration for Intelligent Systems, Jul. 30 to Aug. 1, 2003, 226-233.

Kittler et al, "On Combining Classifiers", IEEE Transactions on Pattern Analysis and Machine Intelligence, Mar. 1 to Mar. 31, 1998, p. 226-239.

* cited by examiner

PRIOR ART

CLEAR IMAGE USING PIXEL VOTING

BACKGROUND OF THE INVENTION

Many photographers go to extreme lengths, such as waking up early in the morning, in an attempt to photograph public locations without having people walk through their photo. Historically, some photographers (with a lot of time on their hands) have utilized very dark neutral density filters over their lens, allowing very long exposure times in the hope that people in the way of their desired subject will keep moving, and their contribution to the resulting photo will be so blurred as to be undetectable. Other photographers have used large numbers of multiple exposures as people move around in front of their subject in the hope that each person will be in only one of the multiple exposures and their "ghostly" representation in the final image will be so faint as to be undetectable. These processes have worked well in certain situations, however, problems remain. First of all these exposures take a very long time to capture and extreme care must be taken in calculating exposure times. Secondly, even though the unwanted people are blurred or faint, there is still contribution to the final exposure by these unwanted subjects.

SUMMARY OF THE INVENTION

A user provides a plurality of digital images of a single subject all taken from a single location and with common camera settings. This set of digital images is parsed one pixel location at a time. For each pixel location, a set of pixel colors is extracted from each of the plurality of digital images. For each of these pixel colors, a relationship parameter to each of the other pixel colors in the set is calculated. Using this relationship parameter information, the final desired pixel color is chosen and applied to the pixel location in a final image.

Other aspects and advantages of the present invention will become apparent from the following detailed description, taken in conjunction with the accompanying drawings, illustrating by way of example the principles of the invention.

DETAILED DESCRIPTION

This description of the preferred embodiments is intended to be read in connection with the accompanying drawings, which are to be considered part of the entire written description of this invention. In the description, relative terms such as "lower," "upper," "horizontal," "vertical," "up," "down," "top," "bottom," "left," and "right" as well as derivatives thereof (e.g., "horizontally," "downwardly," "upwardly," etc.) should be construed to refer to the orientation as then described or as shown in the drawing figure under discussion. These relative terms are for convenience of description and normally are not intended to require a particular orientation. Terms concerning attachments, coupling and the like, such as "connected," "coupled," and "interconnected," refer to a relationship wherein structures are secured or attached to one another either directly or indirectly through intervening structures, as well as both movable or rigid attachments or relationships, unless expressly described otherwise.

Figure 1:
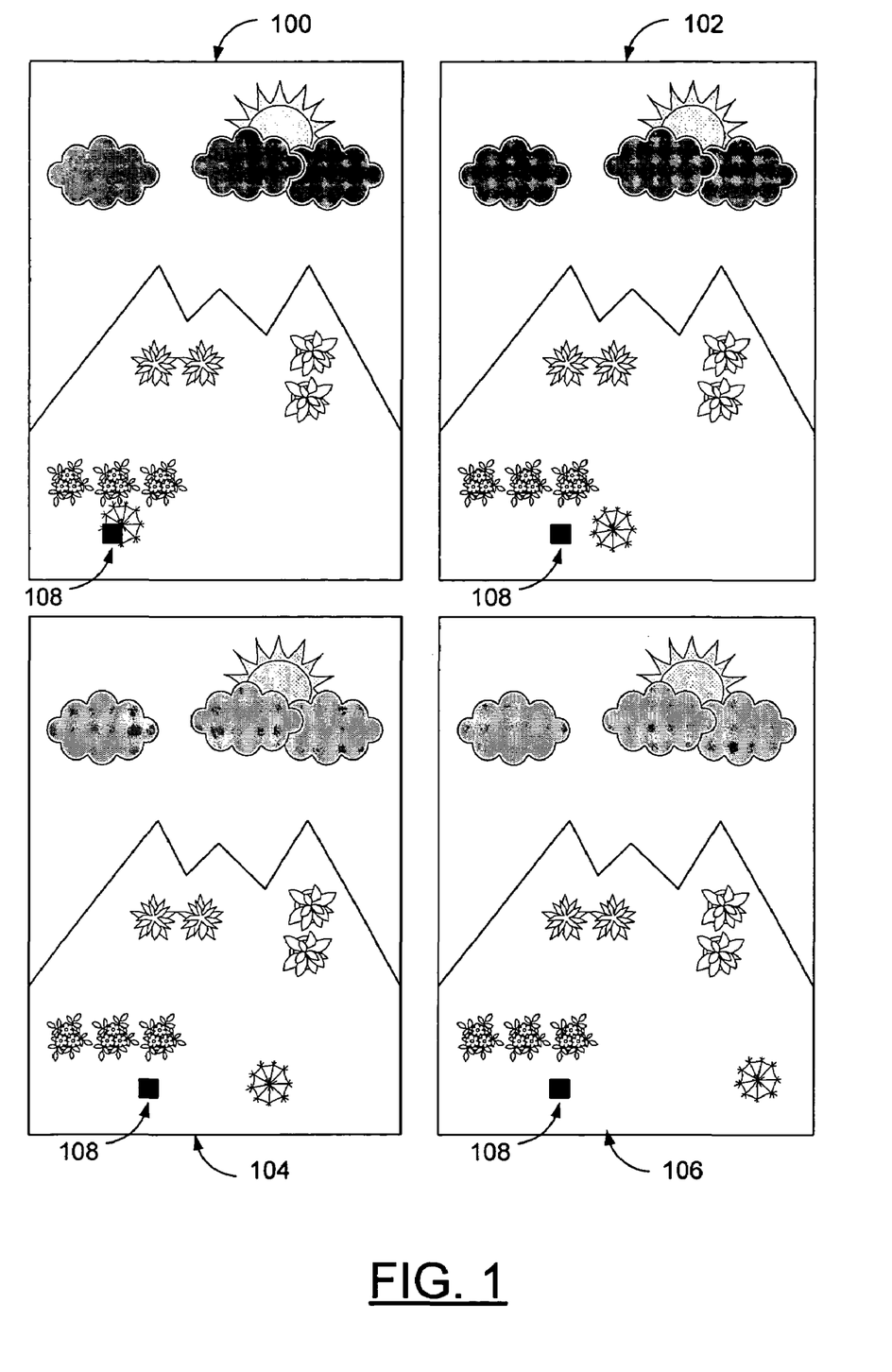
FIG. 1 is an example series of four digital images, all of the same scene taken with similar camera settings.

FIG. 1 is an example series of four digital images, all of the same scene taken with similar camera settings. In this example, four digital images of the same scene are taken by a user with similar camera settings. For best results, a camera support of some sort, such as a tripod, will be used so that the non-moving portions of the images are as identical as possible. In this example embodiment of the present invention a mountain scene with a tumbleweed rolling through the scene is to be processed to remove the moving elements (in this case, the tumbleweed). A selected pixel location 108 is highlighted within each of the images. In the first image 100, the tumbleweed is located at the selected pixel location 108, and the color of this pixel location 108 in this first image 100 will be that of the tumbleweed. In the second image 102, the tumbleweed has now moved to the right of the selected pixel location 108 and the color of this pixel location 108 in this second image 102 will be that of the background. In the third image 104, the tumbleweed has now moved further to the right of the selected pixel location 108 and the color of this pixel location 108 in this third image 104 will be that of the background. In the fourth image 106, the tumbleweed has now moved still further to the right of the selected pixel location 108 and the color of this pixel location 108 in this fourth image 106 will be that of the background. Those of skill in the art will recognize that the results of the process of removing moving objects according to the present invention will be improved with the availability of more initial images, and by the use of a support to stabilize the camera. Any number of initial images may be used within the scope of the present invention. If necessary, pre-processing of the set of initial images may be applied to align the features within the set of initial images such that individual pixel locations within the set of initial image all represent the same portion of the captured scene. In other words, it is desired that each pixel location within the set of images corresponds to the same small (pixel sized) area of the image. Those of skill in the art will recognize that there are a wide variety of methods that may be used to align digital images all within the scope of the present invention. These methods are commonly used when a series of digital images is stitched together to form a panoramic image.

Figure 2:
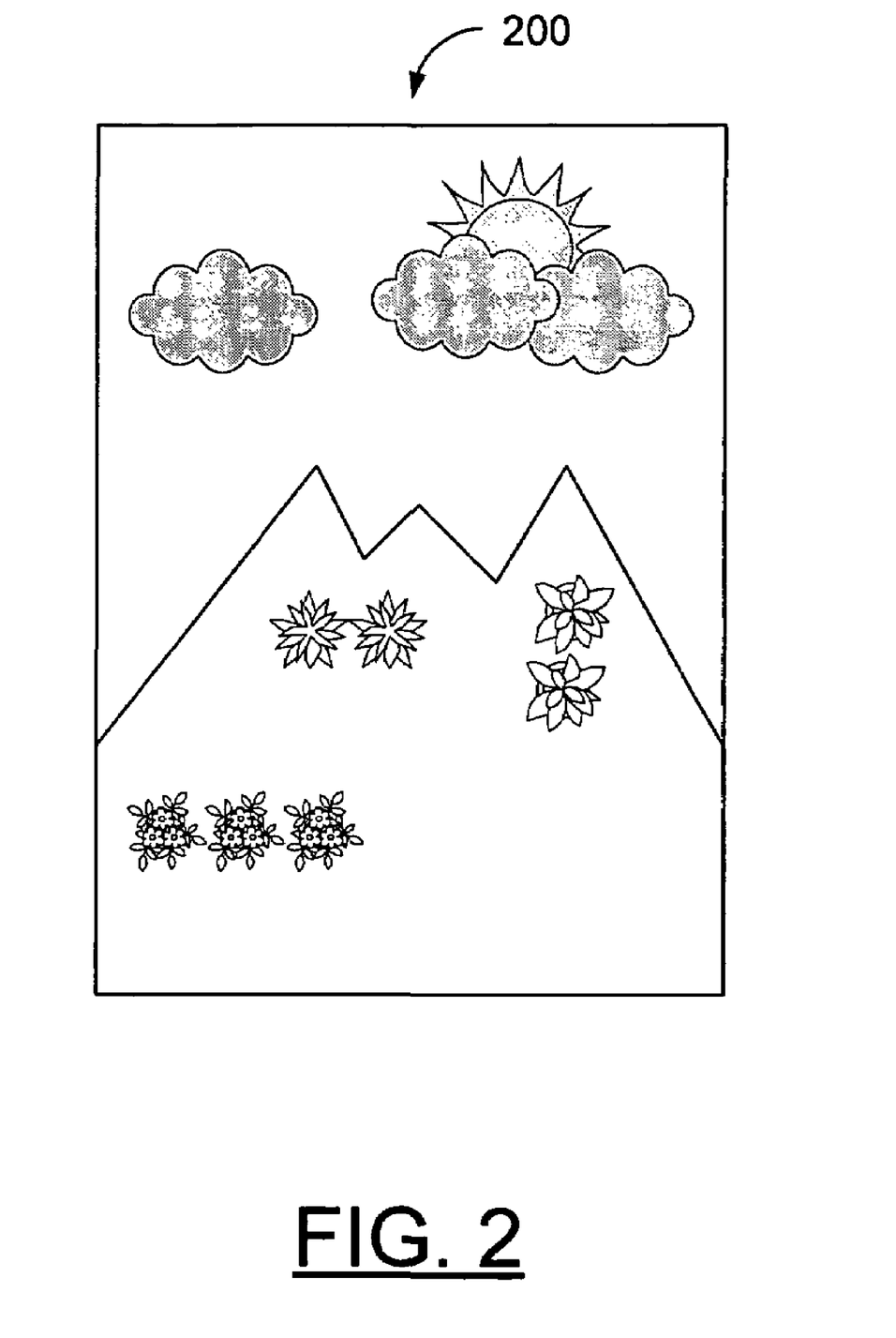
FIG. 2 is an example final image generated from the images of FIG. 1 with all of the moving objects removed from the final image according to an example embodiment of the present invention.

FIG. 2 is an example final image generated from the images of FIG. 1 with all of the moving objects removed from the final image according to an example embodiment of the present invention. This example embodiment of the present invention shows the results of the use of the method of the present invention to remove moving objects from images. The four images of FIG. 1 have been processed to remove the moving tumbleweed from the image, and this final image 200 shows the scene from the images of FIG. 1 without the moving tumbleweed. Obviously, this method may be used to remove a very wide variety of moving objects from a series of images.

Figure 3:
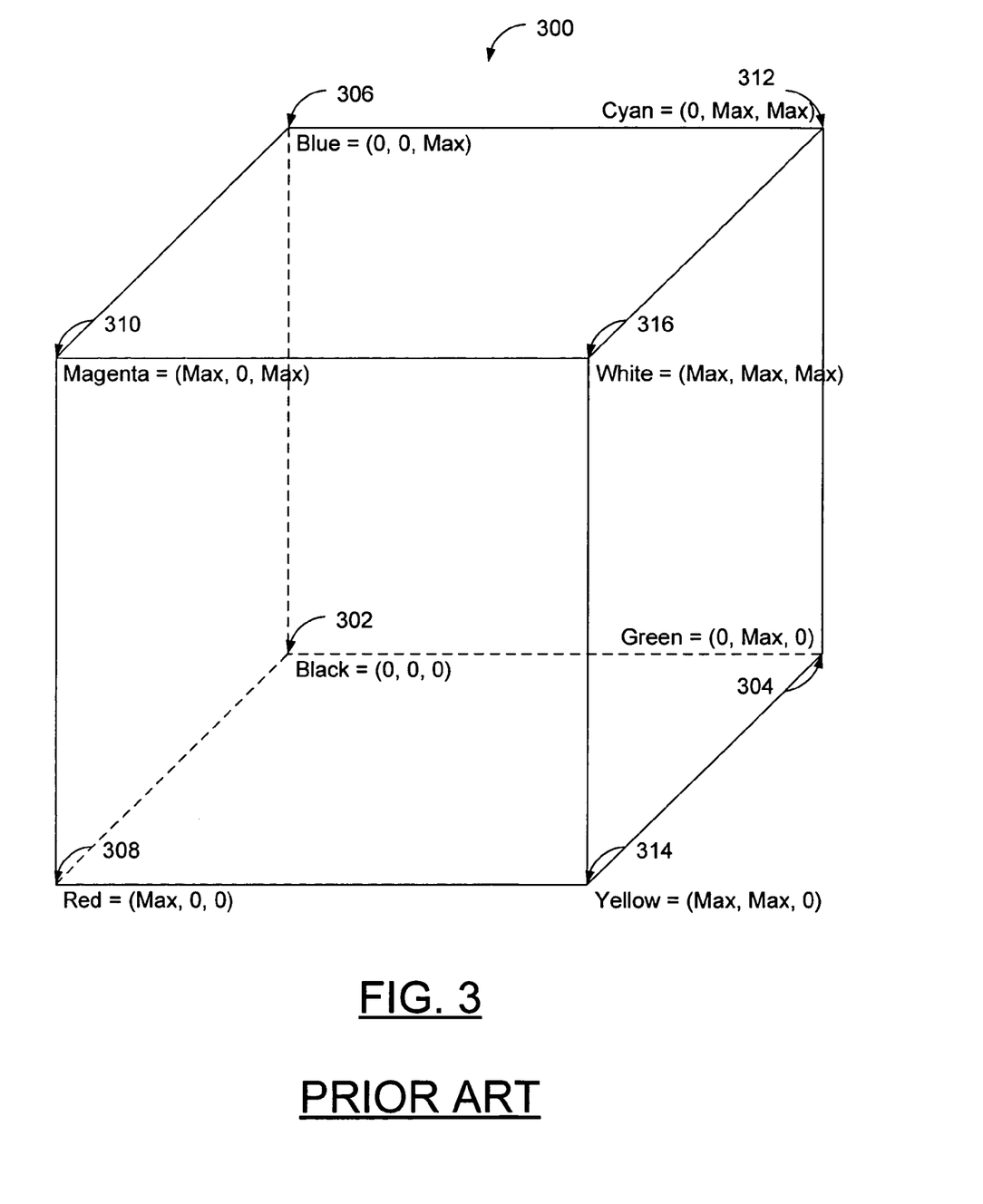
FIG. 3 is an illustration of the red-green-blue (RGB) color space.

FIG. 3 is an illustration of the red-green-blue (RGB) color space. In this example embodiment of the present invention a RBG color space 300 is used for calculation of relationship parameters between pixel colors. Those of skill in the art will recognize that there are a very wide variety of possible color spaces that may be used all within the scope of the present invention, and the RGB color space is simply an example of one of the possible color spaces. In the RGB color space 300, the color black is located at the point (0, 0, 0) 302, and white is located at the point (Max, Max, Max) 316, where Max is set to the maximum possible value of the chosen color space. For example, using 8-bits to represent each of the red, green, and blue colors, Max would be the hexadecimal value of FF or 255 in decimal. Other embodiments of the present invention may use more or less bits to represent each of the axes in the chosen color space, all within the scope of the present invention. In the RGB color space 300, the color red is located at the point (Max, 0, 0) 308, green is located at the point (0, Max, 0) 304, blue is located at the point (0, 0, Max) 306, magenta is located at the point (Max, 0, Max) 310, cyan is located at the point (0, Max, Max) 312, and yellow is located at the point (Max, Max, 0) 314.

Figure 4:
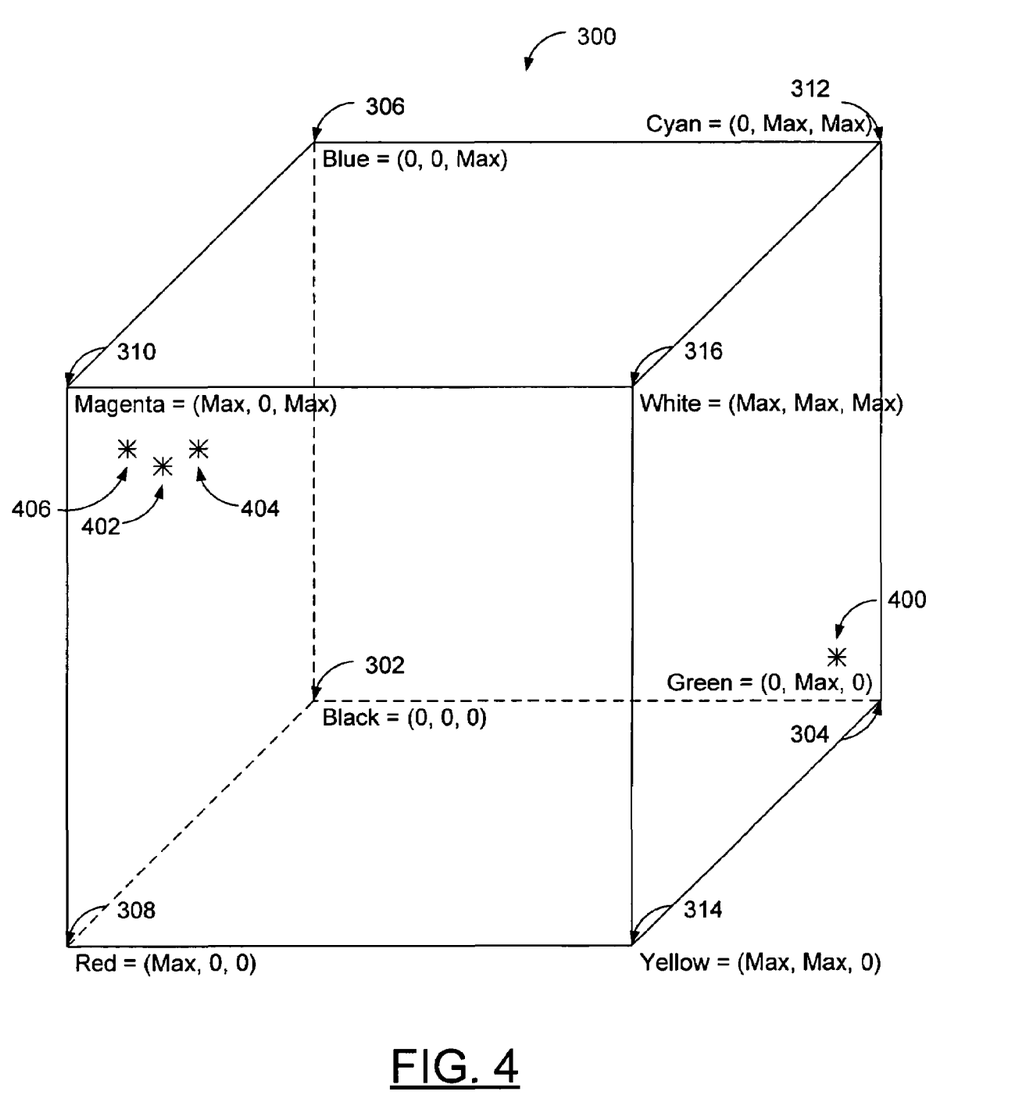
FIG. 4 is an illustration of the RGB color space from FIG. 3 with the color location of four pixel colors plotted in the color space according to an example embodiment of the present invention.

FIG. 4 is an illustration of the RGB color space from FIG. 3 with the color location of four pixel colors plotted in the color space according to an example embodiment of the present invention. In this example embodiment of the present invention, the colors of the selected pixel location 108 from the series of four digital images 100, 102, 104, and 106 from FIG. 1 have been plotted in the RGB color space from FIG. 3. In this example, the color of pixel location 108 from the first image 100 is located at a first point 400 near the green corner of the RGB color space, and represents the color of the tumbleweed from FIG. 1. The color of pixel location 108 from the second image 102 is located at a second point 402 near the magenta corner of the RGB color space, and represents the color of the background from FIG. 1. The color of pixel location 108 from the third image 104 is located at a third point 404 near the magenta corner of the RGB color space, and represents the color of the background from FIG. 1. The color of pixel location 108 from the fourth image 106 is located at a fourth point 406 near the magenta corner of the RGB color space, and represents the color of the background from FIG. 1.

From this color data a relationship parameter is calculate between each pair of colors. For example, starting with the first point 400, a first relationship parameter is calculated between this point and the second, third, and fourth points 402, 404, and 406. In some example embodiments of the present invention this relationship parameter is the distance in the color space between the points. When the distance between points is used as the relationship parameter on this set of data, the relationship parameter will be small between the second, third, and fourth points 402, 404, and 406, and large between any of these three points and the first point 400. Thus the set of relationship parameters for the first point 400 will contain three large numbers representing the distance to each of the three other points. For the second point 402, the set of relationship parameters will contain one large number representing the distance to the first point 400, and two small numbers representing the distance to the third and fourth points 404, and 406. Similarly, the set of relationship parameters for the third and fourth points 404, and 406 will contain two small numbers and one large number. By examining these sets of data points and selecting the set with the smallest sum of relationship parameters, in this example embodiment of the present invention, either the second 402, third 404, or fourth point 406 will be selected as the pixel color for the current pixel location 108 of the final image and this pixel will be the color of the background, not the tumbleweed. This system of "pixel voting" may be used with formulas for calculating relationship parameters other than the distance formula shown in this example embodiment of the present invention.

In some cases involving three or more different colors among the set of pixel colors for the current pixel location including a pixel color near the center (gray) of the color space, the distance function may actually select the incorrect color. It may be desirable for some sets of images to use a different formula for calculating the relationship parameters. For example, using the sum of the square roots of the distances in color space may, in some cases, give more accurate results than using the sum of the distances themselves. Other functions such as a $\log_2$ of the distances may be used in other embodiments of the present invention. Functions with a positive first derivative, but a negative second derivative result in relationship parameters such that close distances between pixel colors are the deciding factor in the selection of the final pixel color, and distant pixel colors that are not in the neighborhood of a cluster of pixel colors have such large relationship parameters that they have a very small chance of being selected as the final pixel color.

Figure 5:
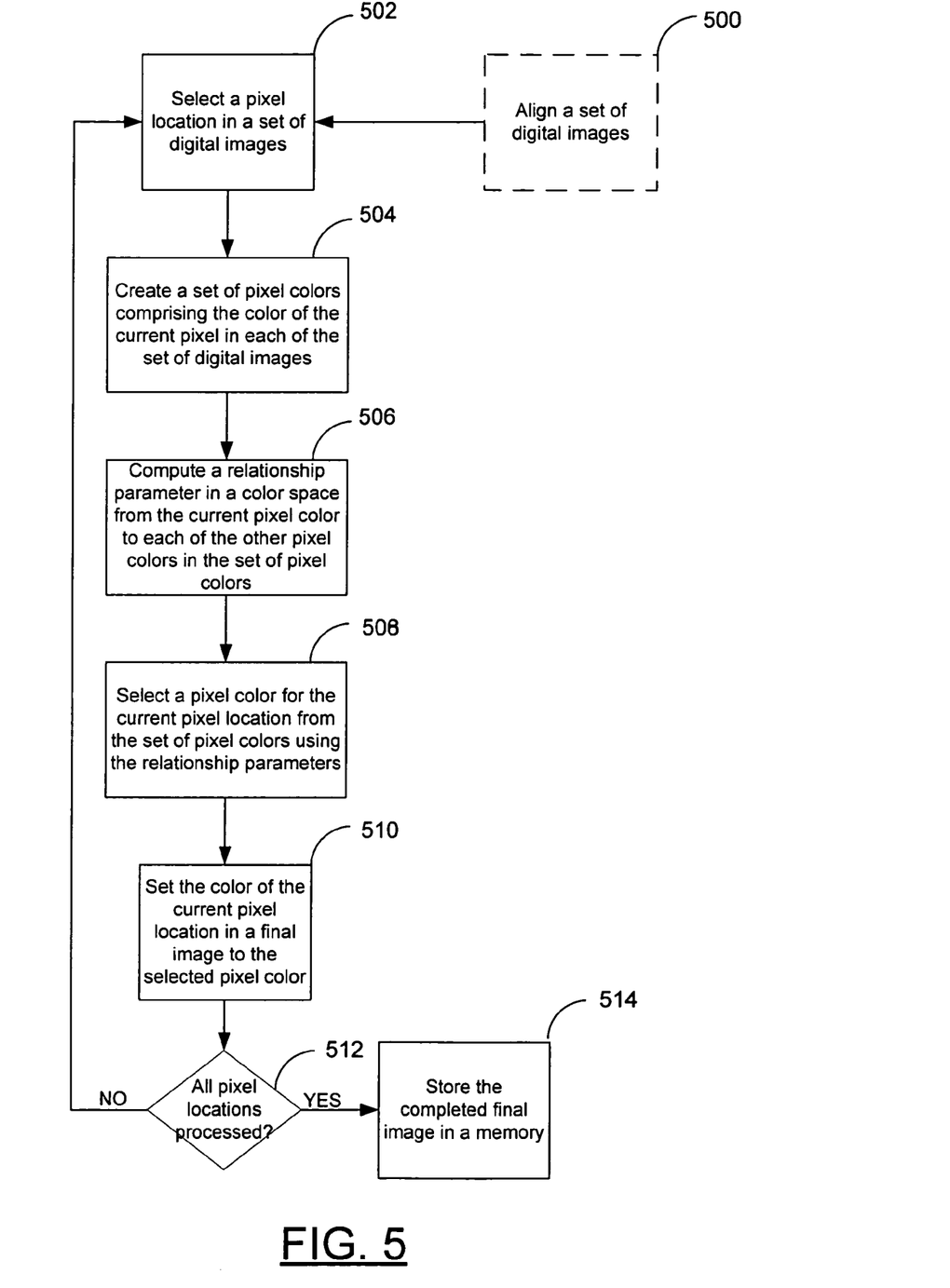
FIG. 5 is a flowchart of an example embodiment of a method of removing moving objects from a series of digital images according to the present invention.

FIG. 5 is a flowchart of an example embodiment of a method of removing moving objects from a series of digital images according to the present invention. In an optional step 500, a series of digital images are aligned with each other. In a step 502 a pixel location within a series of digital images is selected. In a step 504, a set of pixel colors comprising the color of the current pixel location in each of the series of digital images is created. In a step 506, a relationship parameter is computed in a color space for each pixel color to every other pixel color in the set of pixel colors. In a step 508, a final pixel color for the current pixel location is selected from the set of pixel colors using the relationship parameters. In a step 510 the color of the current pixel location in a final image is set to the selected pixel color. In a decision step 512 if all the pixel locations have been processed, control is passed to a step 514 and the final image is stored in a memory. If more pixel locations are remaining to be processed, control is passed to a step 502 where another pixel location is selected.

Figure 6A:
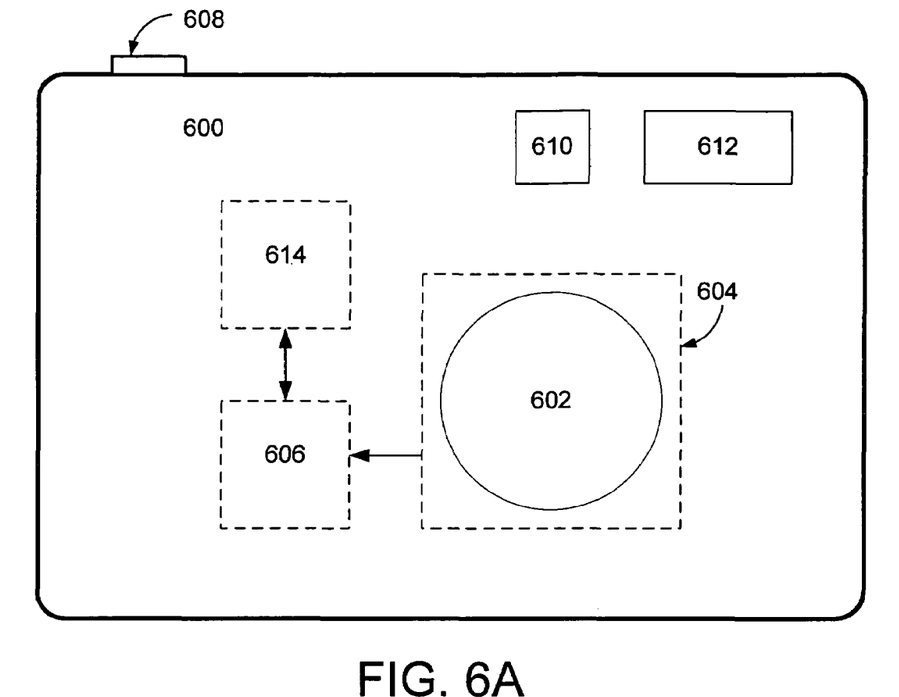
FIG. 6A is a front view of an example embodiment of a device configured to remove moving objects from a series of digital images according to the present invention.

FIG. 6A is a front view of an example embodiment of a device configured to remove moving objects from a series of digital images according to the present invention. In this example embodiment of the present invention, a digital camera is designed including a body 600, a lens 602, an image sensor 604 configure to sense an image projected onto it by the lens 602, a memory 606, electrically coupled with the image sensor 604 configure to store digital image data. The digital camera also includes a processor 614 configured to process a series of digital images, remove moving objects from the digital images, and store a final image in a memory 606. This example digital camera also includes a shutter button 608, a viewfinder 610, and a flash 612. In some example embodiments of the present invention, some or all of the memory 606 may be non-volatile memory. Those of skill in the art will recognize that the method of the present invention may be performed by a wide variety of electronic devices all within the scope of the present invention. While this example embodiment shows the method being performed in a digital camera, the method of the present invention also lends itself well to post-processing of digital images on a computer, printer, or other device all within the scope of the present invention.

Figure 6B:
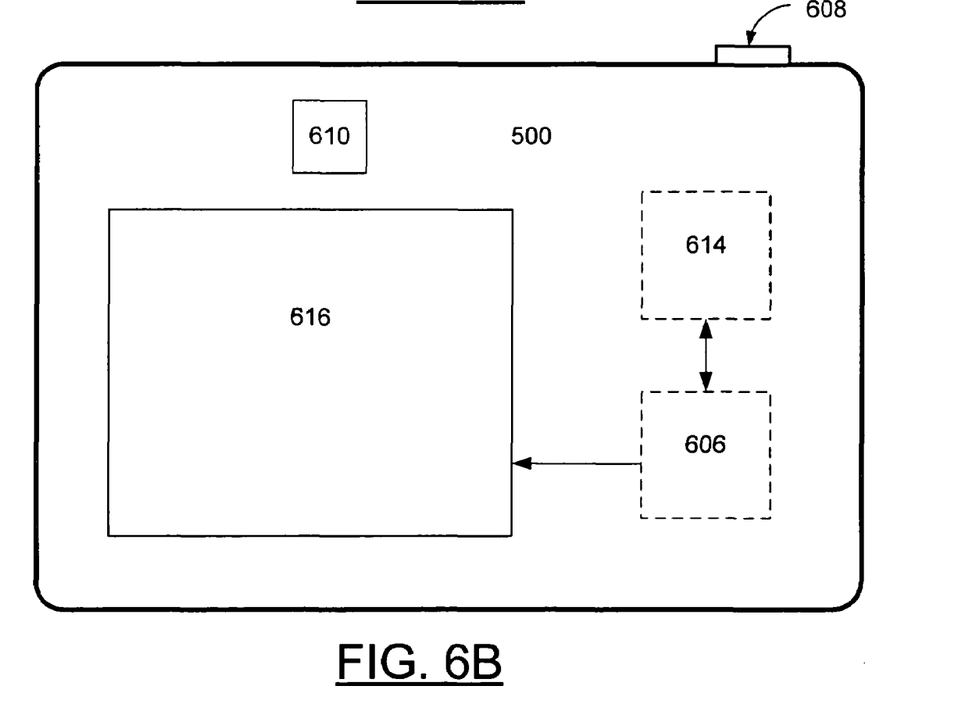
FIG. 6B is a rear view of an example embodiment of a device configured to remove moving objects from a series of digital images according to the present invention.

FIG. 6B is a rear view of an example embodiment of a device configured to remove moving objects from a series of digital images according to the present invention. This example digital camera also includes a display 616 (such as an LCD) electrically coupled to the memory 606 configured to display the series of captured images and to display the final image with all of the moving objects removed from the image.

The foregoing description of the present invention has been presented for purposes of illustration and description. It is not intended to be exhaustive or to limit the invention to the precise form disclosed, and other modifications and variations may be possible in light of the above teachings. The embodiments were chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A method of removing unwanted moving objects from a still image comprising the steps of:
   a) providing a series of digital images representing the still image, each digital image having a plurality of pixels;
   b) selecting a pixel location in the series of digital images;
   c) creating a set of pixel colors corresponding to the colors of the selected pixel location in each of the series of digital images;
   d) computing relationship parameters in a color space from each pixel color to every other pixel color within the set of pixel colors;
   e) selecting the final pixel color from the set of pixel colors using the relationship parameters;
   f) setting the color of the current pixel location in a final image to the selected final pixel color;
   g) checking for any remaining unselected pixel locations, and returning to step b) if any remain; and
   h) storing the completed final image in a memory, wherein the above steps a)-h) are performed by a digital camera.

2. The method recited in claim 1, further comprising the step of:
   i) aligning said series of digital images prior to selecting said pixel location.

3. The method recited in claim 1, wherein said relationship parameters are the distance between the pixel colors in a color space.

4. The method recited in claim 3, wherein said color space is the RGB color space.

5. The method recited in claim 1, wherein said relationship parameters are the square root of the distance between the pixel colors in a color space.

6. The method recited in claim 5, wherein said color space is the RGB color space.

7. The method recited in claim 1, wherein said relationship parameters are the $\log_2$ of the distance between the pixel colors in a color space.

8. The method recited in claim 7, wherein said color space is the RGB color space.

9. The method recited in claim 1, wherein said relationship parameters are calculated using a function with a positive first derivative and a negative second derivative on the pixel colors in a color space.

10. The method recited in claim 9, wherein said color space is the RGB color space.

11. A digital camera capable of removing unwanted moving objects from a digital image comprising:
    a camera body;
    a memory configured to store a series of digital images representing a still image, each digital image having a plurality of pixels; and
    a processor within said body, electrically coupled to said memory, configured to:
        receive said series of digital images for processing;
        select a pixel location in said series of digital images;
        create a set of pixel colors corresponding to the colors of said selected pixel location in each of said series of digital images;
        compute relationship parameters in a color space from each pixel color to every other pixel color within said set of pixel colors;
        select a final pixel color from said set of pixel colors using said relationship parameters;
        set the color of the current pixel location in a final image to said selected final pixel color;
        check for any remaining unprocessed pixel locations, and select another pixel location if any remain; and
        store the completed final image in said memory.

12. The digital camera recited in claim 11, wherein said processor is also configured to align said series of digital images prior to processing.

13. The digital camera recited in claim 11, wherein said relationship parameters are the distance between said pixel colors in a color space.

14. The digital camera recited in claim 13, wherein said color space is the RGB color space.

15. The digital camera recited in claim 11, wherein said relationship parameters are the square root of the distance between the pixel colors in a color space.

16. The digital camera recited in claim 15, wherein said color space is the RGB color space.

17. The digital camera recited in claim 11, wherein said relationship parameters are the $\log_2$ of the distance between the pixel colors in a color space.

18. The digital camera recited in claim 17, wherein said color space is the RGB color space.

19. The digital camera recited in claim 11, wherein said relationship parameters are calculated using a function with a positive first derivative and a second negative derivative on the pixel colors in a color space.

20. The digital camera recited in claim 19, wherein said color space is the RGB color space.

* * * * *